United States Patent [19]

Sinke

[11] 3,878,295

[45] Apr. 15, 1975

[54] METHOD OF PRODUCING HIGH DENSITY CALCIUM CHLORIDE 1/3 HYDRATE

[75] Inventor: Gerard C. Sinke, Midland, Mich.

[73] Assignee: The Dow Chemical Company, Midland, Mich.

[22] Filed: Sept. 24, 1973

[21] Appl. No.: 400,095

[52] U.S. Cl. ... 423/497; 23/304; 423/158; 423/159; 23/293 R
[51] Int. Cl...... B01d 9/02; C01f 11/24; C01f 11/30
[58] Field of Search ........... 423/497, 163, 158, 159; 23/304, 293 A, 293 R, 313

[56] References Cited
UNITED STATES PATENTS

| | | | |
|---|---|---|---|
| 1,660,053 | 2/1928 | Smith | 23/304 |
| 1,851,309 | 3/1932 | Heath | 423/497 |
| 1,852,303 | 4/1932 | Heath | 23/304 |
| 2,857,244 | 10/1958 | Graves | 423/497 |

FOREIGN PATENTS OR APPLICATIONS

| | | | |
|---|---|---|---|
| 6,406,731 | 3/1964 | Netherlands | 423/497 |
| 522,613 | 3/1956 | Canada | 423/497 |
| 782,534 | 5/1968 | Canada | 423/497 |
| 562,175 | 11/1957 | Belgium | 423/497 |

*Primary Examiner*—Wilbur L. Bascomb, Jr.
*Assistant Examiner*—S. J. Emery
*Attorney, Agent, or Firm*—Robert W. Selby; Lloyd S. Jowanovitz

[57] ABSTRACT

Method to produce a high density calcium chloride particulate. Calcium chloride hydrate is precipitated from a saturated solution maintained at about 185°C. to about 230°C. The precipitate is removed from the solution before cooling to a temperature below the precipitation range.

23 Claims, No Drawings

METHOD OF PRODUCING HIGH DENSITY CALCIUM CHLORIDE

BACKGROUND OF THE INVENTION

This invention pertains to a process for preparing calcium chloride and more in particular to a process of preparing high density calcium chloride particulate.

Hydrated and anhydrous calcium chloride particulate have been commonly produced by methods such as those described in U.S. Pat. Nos. 1,922,697; 2,646,343 and 2,857,244. It is desired to provide a method of producing a high density calcium chloride particulate.

SUMMARY OF THE INVENTION

It has been surprisingly found that calcium chloride particulate with a density greater than that of anhydrous calcium chloride can be produced by precipitating calcium chloride from a saturated aqueous calcium chloride solution when the temperature of the solution is maintained within the range of from about 185° to about 230°C., preferably about 187° to about 230°C. and more preferably about 195° to about 215°C. Impurities such as the chlorides of sodium, strontium and potassium will naturally lower the minimum precipitation temperature slightly below 187°C. The precipitation is carried out in an environment with a pressure sufficient to afford obtention of the desired solution temperature. Preferably the absolute pressure is from about 860 to about 2500 millimeters of mercury (mm Hg) and more preferably from about saturated to about 2500 mm Hg. The precipitated calcium chloride is believed to be a previously unreported one-third hydrate of calcium chloride having the formula of $CaCl_{temperature}.\frac{1}{3} H_2O$. The precipitate is recovered from the solution while the solution is maintained under the above described precipitation conditions, i.e., temperature and pressure. The precipitate is cooled by appropriate means after removal thereof from the remaining solution.

The high density calcium chloride particulate formed by the hereinbefore described process is generally useful for the same purposes as other calcium chloride products. For example, the new calcium chloride hydrate is advantageously employed to melt ice on highways.

DESCRIPTION OF THE PREFERRED EMBODIMENTS

High density calcium chloride hydrate containing about 4 to about 6 weight per cent water with the balance being calcium chloride and minor impurities has been produced by direct precipitation from an aqueous calcium chloride solution. The calcium chloride hydrate, believed to be the one-third hydrate, surprisingly has a density of about 2.34 to about 2.37 grams per cubic centimeter (gm/cc) whereas the density of anhydrous calcium chloride is only about 2.15 gm/cc. The melting point of the new hydrate is about 230°C.

In a preferred embodiment, the calcium chloride hydrate is produced by first providing a solution which is saturated with calcium chloride when the solution is maintained at temperature of from about 195° to about 215°C. A sufficient portion of the aqueous phase of the saturared solution is then caused to evaporate by known means to thereby precipitate calcium chloride particulate from the solution. During evaporation and precipitation, the solution is preferably maintained at a saturated within the range of from about 195° to about 215°C. and autogenous pressure.

One means of providing the saturated calcium chloride solution is to evaporate sufficient water from an unsaturated calcium chloride solution to gradually increase the calcium chloride concentration to saturation. Evaporation can be initiated and carried out by, for example, heating the solution and/or reducing the pressure sufficiently to cause evaporation or vaporization of the aqueous or water phase of the solution. Preferably the solution has a calcium chloride to water ratio of from about 3.0 to 1 to about 3.35 to 1 during the precipitation step. Advantageously the solution is agitated by suitable known means during precipitation.

As aforementioned, it is important to remove the precipitated calcium chloride particulate from the solution prior to cooling the solution significantly below about 185°C. Preferably such removal is carried out at a temperature within the range of from about 187° to about 230°C. and more preferably from about 195° to about 215°C. Removal of the precipitated calcium chloride hydrate can be carried out by means known to the skilled in the art such as decantation, filtering or by centrifugal means.

After the calcium chloride particulate has been removed or separated from the remaining liquid phase of the original solution, it is cooled to preferably about room temperature. The liquid phase can also be cooled, if desired, or recirculated without cooling and reused in the process to provide a calcium chloride source. If the remaining solution is reused, additional calcium chloride or a solution thereof can be added to the residual solution from which the calcium chloride hydrate precipitated.

The following examples further illustrate the invention:

EXAMPLE 1

A 22 gram quantity of 75.98 weight per cent AR grade calcium chloride hydrate and one gram of distilled water were placed in a closed Fisher-Porter tube and heated in an oil bath to and maintained at a temperature of 190°C. for 2 hours and then at 194°C. for 3 hours at autogenous pressure to melt and dissolve the calcium chloride. After dissolution of the calcium chloride, water vapor was released from the tube to form a saturated calcium chloride solution and precipitate a calcium chloride hydrate. The saturated solution was stirred during a portion of the precipitation period. The temperature was maintained at 194°C. until substantially all of the water had vaporized and been removed from the tube. The precipitated calcium chloride was cooled to room temperature. X-ray analysis confirmed that the precipitate was $CaCl_2.\frac{1}{3}H_2O$.

EXAMPLES 2–5

Calcium chloride hydrate was prepared in a manner similar to that described for Example 1 except that the hot calcium chloride solution was decanted from the precipitated $CaCl_2.\frac{1}{3}H_2O$. The temperatures employed were 193°, 200° and 225.5°C. Differential thermal analysis and/or X-ray methods confirmed that the precipitate was $CaCl_2.\frac{1}{3}H_2O$.

A precipitation temperature of 189° to 190°C. resulted in a mixture of $CaCl_2.\frac{1}{3}H_2O$ and $CaCl_2.2H_2O$. with a trace amount of $CaCl_2.H_2O$.

EXAMPLE 6

The density of $CaCl_2 \cdot \frac{1}{3}H_2O$ produced substantially in accord with Examples 1–5 was determined to be 2.36 gm/cc.

What is claimed is

1. A method of producing calcium chloride comprising sequentially (a) precipitating $CaCl_2 \cdot \frac{1}{3}H_2O$ from a saturated aqueous calcium chloride solution maintained within the temperature range from about 185° to about 230°C.; (b) separating the precipitated calcium chloride from the solution within the temperature range of from about 185° to about 230°C; (c) and then cooling the precipitated calcium chloride to thereby produce a calcium chloride particulate with a density greater than anhydrous $CaCl_2$.

2. The method of claim 1 wherein the pressure during precipitation is from about 860 to about 2500 mm Hg.

3. The method of claim 1 wherein the precipitation and recovery steps are carried out within the temperature range of from about 187° to about 230°C.

4. The method of claim 3 wherein the calcium chloride is precipitated from a solution with a calcium chloride to water ratio of from about 3.0 to 1 to about 3.35 to 1.

5. The method of claim 1 wherein the precipitation and recovery steps are carried out within the temperature range of from about 195° to about 215°C.

6. The method of claim 5 wherein the calcium chloride is precipitated from a solution with a calcium chloride to water ratio of from about 3.0 to 1 to about 3.35 to 1.

7. The method of claim 1 wherein the precipitated calcium chloride is removed by filtering.

8. The method of claim 1 wherein the precipitated calcium chloride is removed by centrifugal means.

9. The method of claim 1 wherein the cooled calcium chloride precipitate has a density of about 2.34 to about 2.37 gm/cc.

10. A method to prepare a calcium chloride hydrate particulate comprising providing an aqueous calcium chloride solution saturated with calcium chloride at a temperature within the range from about 185° to about 230°C.; evaporating a sufficient portion of an aqueous phase of the solution to precipitate $CaCl_2 \cdot \frac{1}{3}H_2O$ from the solution while maintaining the solution within the temperature range of from about 185° to about 230°C. and within a pressure range of from about 860 to about 2500 mm Hg; and then separating the precipitated calcium chloride hydrate from the solution while maintaining the solution within the temperature range of from about 185° to about 230°C.; and then cooling the precipitate to produce particulate $CaCl_2 \cdot \frac{1}{3} H_2O$ with a density of greater than that of anhydrous $CaCl_2$.

11. The method of claim 10 wherein the precipitation and recovery steps are carried out within the temperature range of from about 187° to about 230°C.

12. The method of claim 10 including recirculating the depleted solution to the evaporation step after recovery of the precipitate.

13. The method of claim 10 including agitating the solution during precipitation.

14. The method of claim 10 wherein the $CaCl_2 \cdot \frac{1}{3} H_2O$ is precipitated from a solution with a calcium chloride to water ratio of from about 3.0 to 1 to about 3.35 to 1.

15. The method of claim 10 wherein the precipitate is $CaCl_2 \cdot \frac{1}{3}H_2O$.

16. The method of claim 10 wherein the precipitate is a calcium chloride hydrate with a density of about 2.34 to about 2.37 gm/cc.

17. A method to prepare $CaCl_2 \cdot \frac{1}{3}H_2O$ comprising evaporating sufficient water from an aqueous calcium chloride solution to provide a saturated calcium chloride solution when the solution is maintained within the temperature range from about 187° to about 230°C; precipitating $CaCl_2 \cdot \frac{1}{3}H_2O$ from the solution while maintaining the solution within a temperature range of from about 187° to about 230°C.; removing the precipitated $CaCl_2 \cdot \frac{1}{3}H_2O$ from the solution while maintaining the solution within a temperature range of from about 187° to about 230°C.; and then cooling the precipitate to produce particulate $CaCl_2 \cdot \frac{1}{3}H_2O$ with a density greater than that of anhydrous $CaCl_2$.

18. The method of claim 17 wherein the solution is agitated during precipitation.

19. The method of claim 17 wherein the $CaCl_2 \cdot \frac{1}{3}H_2O$ is precipitated from a solution with a calcium chloride to water ratio of from about 3.0 to 1 to about 3.35 to 1.

20. The method of claim 17 wherein the precipitation and removal steps are carried out within the temperature range of from about 195° to about 215°C.

21. An improved method of forming particulate calcium chloride by precipitating a calcium chloride hydrate from an aqueous calcium chloride solution at an elevated temperature, the improvement comprising precipitating calcium chloride hydrate from a saturated aqueous calcium chloride solution maintained within the temperature range of from about 185° to about 230°C.; separating the precipitated calcium chloride hydrate from the remaining solution while maintaining the solution temperature within the precipitation temperature range; and then cooling the separated calcium chloride hydrate to produce a calcium chloride particulate with a density of about 2.34 to about 2.37 grams per cubic centimeter.

22. The improvement of claim 21 wherein the precipitation temperature range is from about 195° to about 215°C.

23. The improvement of claim 21 wherein the particulate is $CaCl_2 \cdot \frac{1}{3}H_2O$.

* * * * *

UNITED STATES PATENT OFFICE
CERTIFICATE OF CORRECTION

PATENT NO. : 3,878,295
DATED : April 15, 1975
INVENTOR(S) : Gerard C. Sinke

It is certified that error appears in the above-identified patent and that said Letters Patent are hereby corrected as shown below:

Col. 1, in the Title, add --1/3 HYDRATE--;

Col. 1, line 31, delete "saturated" and insert --960--;

Col. 1, lines 34-35, delete "CaCl temperature 1/3 $H_2O$" and insert --$CaCl_2 \cdot 1/3\ H_2O$--;

Col. 2, line 2, delete "saturated" and insert --temperature--.

Signed and Sealed this

Third Day of August 1976

[SEAL]

Attest:

RUTH C. MASON
Attesting Officer

C. MARSHALL DANN
Commissioner of Patents and Trademarks